United States Patent [19]

Nelson et al.

[11] Patent Number: 5,299,692

[45] Date of Patent: Apr. 5, 1994

[54] METHOD AND APPARATUS FOR REDUCING CARBON CONTENT IN PARTICULATE MIXTURES

[75] Inventors: Robert D. Nelson, Kennesaw; Jerry L. Heavilon; Robert W. Styron, both of Marietta; Bill G. Fletcher, Marietta, all of Ga.

[73] Assignee: JTM Industries, Inc., Kennesaw, Ga.

[21] Appl. No.: 12,999

[22] Filed: Feb. 3, 1993

[51] Int. Cl.5 .............................................. B03B 9/00
[52] U.S. Cl. ........................................ 209/2; 209/3; 209/11; 209/479
[58] Field of Search ........................................ 209/1–3, 209/11, 467–472, 477, 479–481, 493

[56] References Cited

U.S. PATENT DOCUMENTS

| | | |
|---|---|---|
| 1,005,380 | 10/1911 | Wear . |
| 1,010,239 | 11/1911 | Cox . |
| 1,211,495 | 1/1917 | Shore . |
| 1,482,607 | 11/1920 | Gow . |
| 2,935,416 | 5/1960 | Dunbar et al. ............. 117/4 |
| 3,045,825 | 7/1962 | Watson ........................ 209/471 |
| 3,585,155 | 6/1971 | Hollstein .................... 260/2.5 |
| 3,973,887 | 8/1976 | Breckenfelder ............ 425/101 |
| 4,115,256 | 9/1978 | de Zeeuw .................... 209/3 |
| 4,121,945 | 10/1978 | Hurst et al. ................ 106/288 |
| 4,288,959 | 9/1981 | Murdock ..................... 52/518 |
| 4,328,320 | 5/1982 | Reszniak et al. ........... 521/84 |
| 4,331,726 | 5/1982 | Cleary ......................... 428/143 |
| 4,357,234 | 11/1982 | Inculet et al. ............... 209/127 |
| 4,405,680 | 9/1983 | Hansen ........................ 428/285 |
| 4,490,493 | 12/1984 | Mikols ......................... 524/68 |
| 4,517,078 | 5/1985 | Inculet et al. ............... 209/127.3 |
| 4,741,443 | 5/1988 | Hanrot et al. .............. 209/467 X |
| 4,745,032 | 5/1988 | Morrison ..................... 428/215 |
| 4,992,102 | 2/1991 | Barbour ...................... 106/645 |
| 5,024,334 | 6/1991 | Misra et al. ................ 209/467 X |
| 5,106,422 | 4/1992 | Bennett et al. ............ 106/705 |
| 5,109,201 | 4/1992 | Trerice et al. .............. 324/642 |
| 5,160,539 | 11/1992 | Cochran ..................... 106/405 |

OTHER PUBLICATIONS

"Fly Ash and Raw or Calcined Natural Pozzolan . . . ", Annual Book of ASTM Standards, Designation C618-80 (No Date).

"Study of Algal Discoloration of Asphalt Roofing Shingles," J. R. Benemann and J. K. Cochran, 3M Ind. Mineral Prod. Div. (12/87)

Primary Examiner—D. Glenn Dayoan
Attorney, Agent, or Firm—Biebel & French

[57] ABSTRACT

Methods and apparatus for reducing the carbon content of fly ash are disclosed. The fly ash is subjected to an inclined surface having first and second vibratory sources for respectively moving the fly ash from the elevated end of the incline to the lower end and to disaggregate and stratify a high carbon fraction from an enhanced fly ash fraction. The second vibratory source, in combination with the inclined surface, separates the lighter, high carbon fraction while the heavier enhanced fly ash fraction travels toward the lower end of the incline. An air jet and associated vacuum draft pull the high carbon fraction from the incline, leaving the enhanced fly ash portion for use, after removal from the surface, as an example, as acceptable mineral admixture for use in Portland Cement concrete.

32 Claims, 4 Drawing Sheets

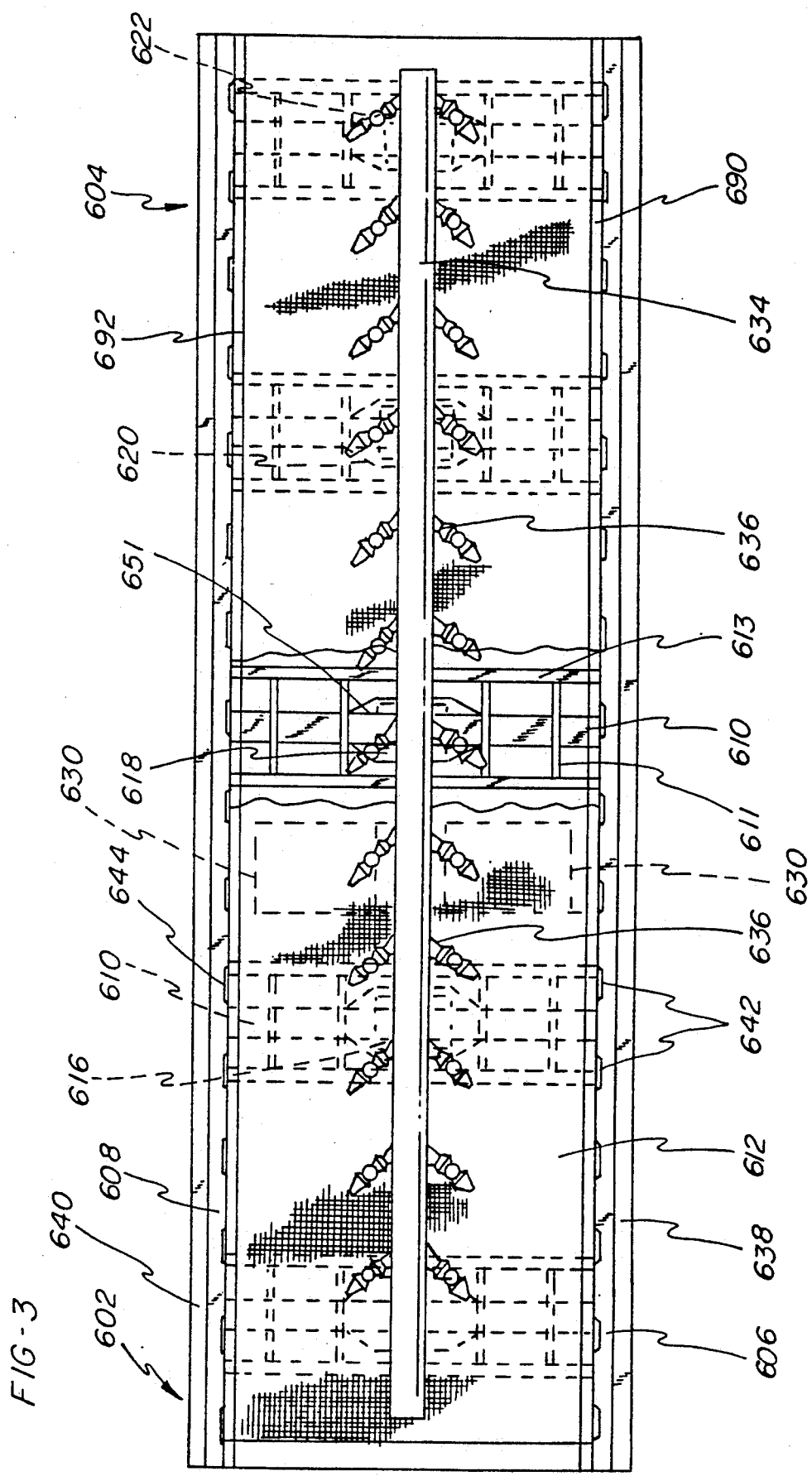

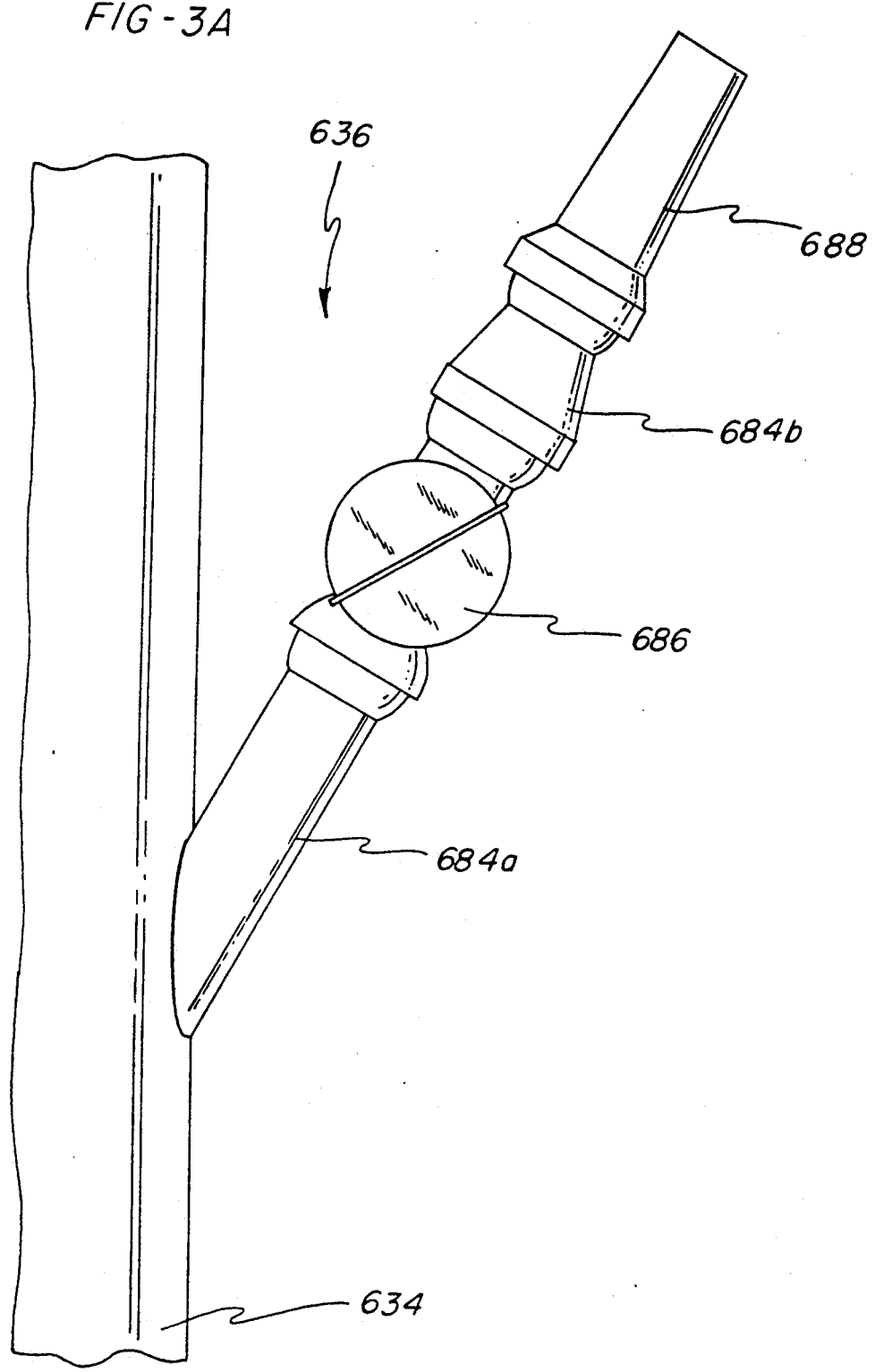

METHOD AND APPARATUS FOR REDUCING CARBON CONTENT IN PARTICULATE MIXTURES

FIELD OF THE INVENTION

The present invention pertains to methods and apparatus for reducing the carbon content in particulate mixtures, such as fly ash and wood ash.

BACKGROUND OF THE INVENTION

Fly ash is the by-product of burning pulverized coal. Wood ash is defined as the inorganic residue of wood combustion. Although the invention will be described primarily in connection with fly ash processing methods and apparatus, it can also be beneficially employed to reduce the carbon content of wood ash or for any particulate mixture in which it is desired to separate and remove carbon and light weight coarse fractions from the mixture.

The chemical content and particle size of fly ashes vary widely in accordance with the source of the coal, the fineness to which it is ground, and the furnace within which it is burned.

The chemical composition of fly ash may vary generally, as follows:

| Component | Class F Percent by Weight | Class C Percent by Weight |
| --- | --- | --- |
| $SiO_2$ | 35–55 | 20–40 |
| $Al_2O_3$ | 15–35 | 5–15 |
| $FeO$ / $Fe_2O_3$ | 3–25 | 1–10 |
| $CaO$ | 0.5–8 | 0–35 |
| $MgO$ | 0.5–3 | 0–5 |
| $TiO_2$ | 1–3 | 1–3 |
| $Na_2O$ | 0–1.5 | 0–1.5 |
| $K_2O$ | 0–3 | 0–3 |
| $SO_3$ | 1–3 | 0–6 |
| C | 0.5–20 | 0.5–20 |
| $H_2O$ | 0.5–0.7 | 0.5–3 |

Fly ash can be used for a variety of purposes. Principally, it is used as a replacement for cement in Portland Cement concrete. Additionally, for example, it has been used as filler material for plastics and asphalt, as a source of activated carbon for waste water purification, and as a magnetite source for coal cleaning.

Fly ash can also be used as a structural fill, soil additive and base for lime/fly ash, soil cement, or cementitious road way materials and the like. It is little wonder then that fly ash can provide a marketable commodity for utility companies and industrial plants that burn coal in order to generate electrical energy.

Many class F fly ashes collected throughout the United States have carbon content (as measured by Loss on Ignition—LOI) of about 0.5–4%. These ashes may be sold as acceptable mineral admixture for use in Portland cement concrete under the standards set forth in ASTM C-618-92a which limits maximum LOI for classes F and C fly ash at 6%. As such, these ashes are a commercially attractive commodity with the sale of same by electrical utilities and industrial concerns providing lucrative revenue.

Unfortunately, not all fly ashes possess such low carbon content as to pass the standards provided in ASTM C-618. These non-conforming fly ashes have LOI content of greater than 6%, sometimes on the order of >6%–20%.

In addition to lack of conformity with the requirements of ASTM C-618, high carbon content fly ash has been shown to cause undesirable reduction in entrained air in concrete and it provides an oily or dark surface appearance on finished concrete surfaces since it floats to the surface during finishing. Moreover, high carbon content fly ash exhibits reduction in desirable pozzolanic reactivity.

Suffice it to say that use of fly ash that is not in conformity with the aforementioned ASTM standard as a mineral admixture in Portland Cement concrete and its consequent failure to meet material specifications raise serious liability problems.

Due to the limitations upon its ultimate end use, such high carbon fly ash also poses a disposal problem.

In light of the above, there exists a need in the industry to provide an inexpensive method and apparatus by which the carbon content (as measured by LOI) of high carbon containing fly ash mixtures can be reduced so that the resulting fly ash will conform with the above ASTM standard; therefore providing that the fly ash can be acceptably sold for and used as a mineral admixture for Portland Cement concrete products and other purposes.

PRIOR ART

Most efforts to remove carbon from fly ash have been directed to methods and apparatus in which the carbon is burned off in various high temperature systems or separated by wet floatation systems. Of course, burning off of the carbon is energy intensive with concomitant high cost. Wet floatation is technically possible, but requires both wetting and drying of the fly ash, again resulting in excessive energy use.

U.S. Pat. No. 4,121,945 (Hurst et al) discloses one such wet process for benefication of fly ash to provide a series of products having higher commercial value than the raw fly ash. In accordance with the disclosure, a carbon concentrate, cenospheres, an iron concentrate, an enhanced pozzolan and an inert mineral filler way be recovered from the fly ash.

Burning of high carbon content fly ash in a dry, bubbling fluid bed reactor is disclosed in U.S. Pat. No. 5,160,539 (Cochran). Fine fly ash particles are utilized as the particle bed with high carbon content fly ash being oxidized in the bed at certain critical temperatures and air/fly ash volume ratios.

Also of general interest is U.S. Pat. No. 5,109,201 (Trevice et al) disclosing methods and apparatus for determining carbon content in fly ash wherein the amount of microwave energy absorbed by the fly ash is compared to the microwave energy irradiated onto the sample.

Of general interest, U.S. Pat. No. 1,482,607 (Gow) can be mentioned for its teaching of separatory methods involving the step of subjecting the particles to an inclined vibrating surface having transversely disposed grooves or corrugations therein. Of somewhat similar import is U.S. Pat. No. 1.005,380 (Wear) disclosing a coffee-chaff separator including a cam used to vibrate an inclined surface in combination with a suction source at the lower end of the incline.

Of further general interest is U.S. Pat. No. 1,211,495 (Shore) which teaches gold separation wherein sand is lifted from gold via a suction source located above an inclined surface. In U.S. Pat. No. 1,010,239 (Cox), tan bark and other light foreign matter are separated from heavier carbonates by subjecting the mixture to inclined vibrating screens with removal of the light fraction at the base of the screen by suction means.

U.S. Pat. No. 3,045,825 (Watson) is also noted of general interest for its disclosure of a dry ore sorter including a blower located at the bottom of an inclined trough to blow lighter materials out of the open upper end of the trough.

The above noted prior art methods and apparatus have not produced or suggested an inexpensive, efficient method or apparatus of reducing carbon content in high carbon fly ashes.

SUMMARY OF THE INVENTION

In accordance with the invention, high carbon content fly ash, on the order of about 4–20% LOI, is fed to the top of an inclined surface that is subjected to plural vibratory sources. The fly ash is heated to a temperature within the range of the dew point to about 100° C. prior to or concurrently with its feed to the elevated end of the inclined surface. These temperatures are needed in order to drive off surface moisture from the fly ash to minimize or eliminate surface tension between particles.

The feed of fly ash to the top of the inclined surface is controlled by a variable speed drive to vary the flow of fly ash onto the inclined surface. The inclination angle of the inclined surface may be varied to accommodate the many varying chemical and physical properties of different fly ash sources.

The inclined surface is composed of a flexible surface, such as polyurethane fabric belt, suspended over a plurality of bars that are disposed transversely under the fabric with regard to lengthwise direction of the fabric. The bars span from one side frame member to another.

A first vibrator or first pair of vibrators is positioned along the incline at an angle of about 30°–55° relative to the inclined surface. This vibrator or pair of vibrators operates at the relatively low frequency of about 600–1200 vibrations per minute. This low frequency functions to move the fly ash particles from the elevated end of the inclined surface toward the bottom, lower end.

A second set of vibrators, positioned along the length of the incline, serves to disaggregate and stratify the fly ash particles into a high carbon content fraction and a heavier, enhanced fly ash particle fraction. Each vibrator in the second set of vibrators is disposed at an angle of about 75°–105° relative to the inclined surface. Preferably, these vibrators are disposed at normal angles relative to the inclined surface. The second set of vibrators operates at a frequency of about 1,000–10,000 vibrations per minute.

Preferably, the inclined surface presents a slight convexity or arc in its shape as viewed in side elevation. One successful arrangement is to provide about a 2-inch crown in the arc that is located about half-way along the length of the inclined surface.

Ultrasonic horns may also be positioned over the incline at a location proximate the lower end to aid in releasing the finer carbon particles from the small channels or vesicles in the fly ash particles.

The fly ash material propelled along the inclined surface by the first, lower frequency vibratory source is gravity discharged from the end of the inclined surface to a collection hopper for storage or subsequent transfer via a mechanical transfer system to a larger storage vessel.

The high carbon fraction of the fly ash is separated from the fly ash and removed from the inclined surface by an air manifold suspended over the center of the inclined surface with nozzles directed toward the sides of the inclined surface. The position of each of the nozzles may be adjusted in an infinite variety of positions due to the provision of ball and joint type nozzle jets. Also, air flow through each nozzle is adjustable.

The manifold and nozzles direct plural streams of low pressure, moderate volume air towards a pair of chambers, each located along a side rail or frame member adjacent to the inclined surface. Each chamber has a plurality of register openings therein with each opening drawing a vacuum created by a pull through fan on a baghouse. The positive pressure dislodges the carbon and other light particles from the surface of the bed of ash and directs it towards the negative pressure of the collection system, thereby separating the two fractions as the fly ash moves down the inclined surface.

The invention will describe in conjunction with the following drawings and detailed description:

DESCRIPTION OF THE DRAWINGS

FIG. 3 is a plan view of a portion of the inclined surface and associated mechanisms shown in FIG. 2; and FIG. 3A is a magnified view of one of the nozzle assemblies shown in FIG. 3.

DETAILED DESCRIPTION OF THE PREFERRED EMBODIMENT

Figure 1:
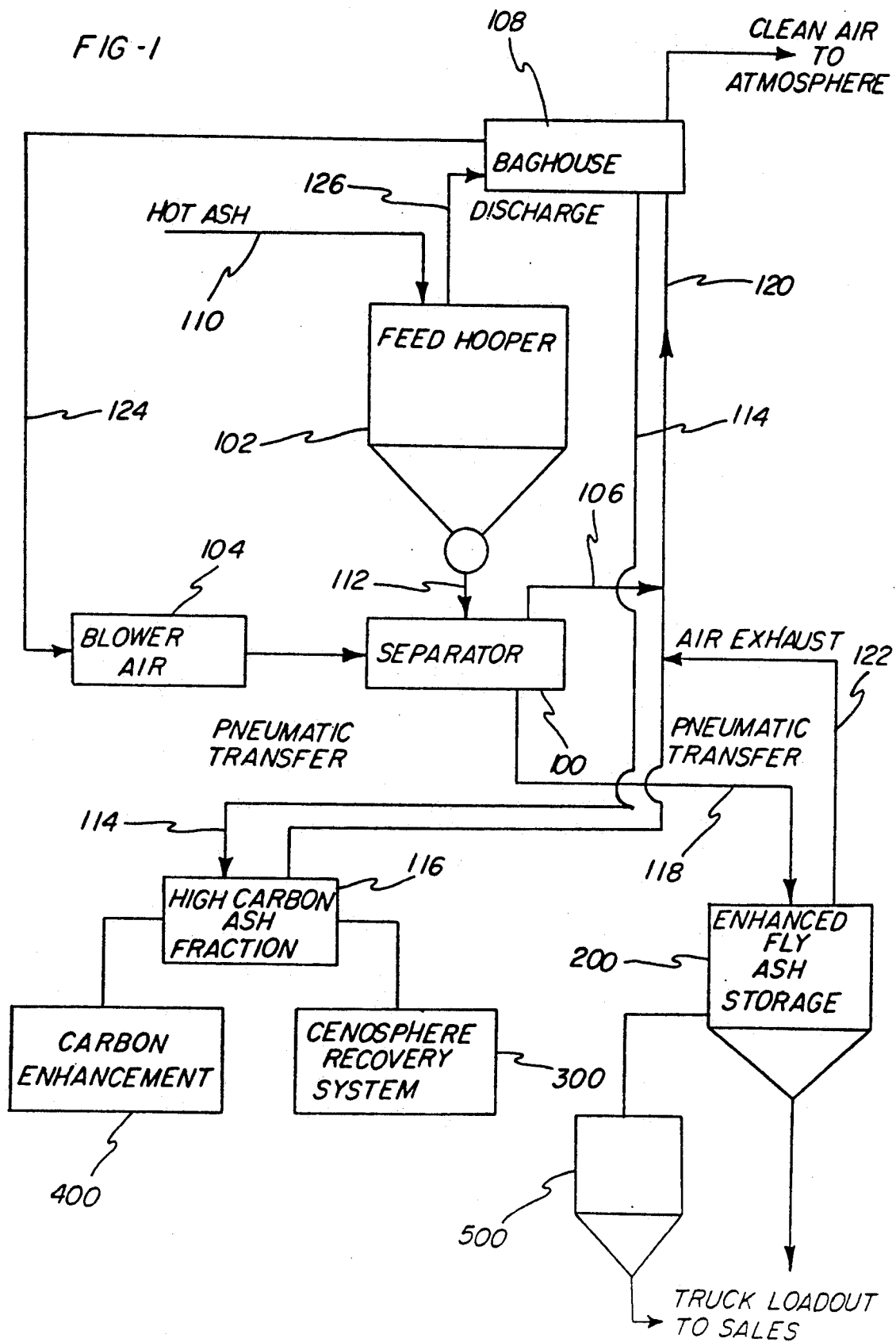
FIG. 1 is a schematic flow diagram of a separation process of the invention.

Turning first to FIG. 1, there is shown a process schematic flow diagram. High carbon (i.e. $\approx$4–20% LOI) fly ash is heated to a temperature of between about the dew point and 100° C. and is admitted to feed hopper 102 via feed line 110. The hopper 102 is disposed in close proximity to the separator 100 and via variable speed feed line 112 feeds the heated raw fly ash to the separator 100. Air is exhausted from the hopper through line 126 to bag house 108.

Blower air emanating from source 104, partially supplied with air via return air line 124, helps separate the higher carbon content fraction from the enhanced fly ash portion in cooperation with vacuum draft 106 pulled through baghouse 108 to deposit the high carbon content fraction in pneumatic transfer line 114 in operative association with high carbon fraction storage area 116.

High carbon fraction from storage area 116 may, in turn, be fed to one or both of carbon enhancement station 400 and/or cenosphere recovery system 300.

In accordance with one particularly unique aspect of the invention, the high carbon content ash fraction separated via separator 100 can be fed to conventional carbon enhancement equipment such as froth floatation cells for subsequent processing to concentrate the carbon content of the fraction. The concentrated carbon fraction may be further processed, dried, and sold for use as carbon black, rubber reinforcing agents, fillers and the like. As per conventional techniques, the carbon black may be used as a precursor for the production of activated carbon for subsequent use in waste water clarification.

In another aspect of the invention, since a high proportion of light weight cenospheres is usually separated with the carbon particles, the cenospheres can be separated from the high carbon ash fraction in a cenosphere recovery system 300 including conventional equipment such as froth floatation cells or by hydroclassifiers and the like, providing a cenosphere rich admixture for commercial sale.

The enhanced fly ash fraction of the fly ash originally fed to the separator is discharged from separator 100 to pneumatic transfer line 118 for transport to enhanced fly ash storage bin 200. Return air line 120 communicates with bin 200 and high carbon fraction storage area 116 and vents to the atmosphere through line 122 drawn through baghouse 108. Ash particles captured in baghouse 108 are fed to pneumatic transfer system 114 for transport to high carbon fraction storage area 116.

Separation of the fly ash via size and specific gravity involves the removal of carbon, cenospheres as noted above, and scoria. This separation therefore facilitates processing of the enhanced fly ash fraction for further use as an industrial extender product where color and particle size are important. These processes may include the removal of additional carbon, magnetite and/or the reduction of the particle size in either wet or dry processes. These processes are schematically shown as number 500 in FIG. 1.

Figure 2:
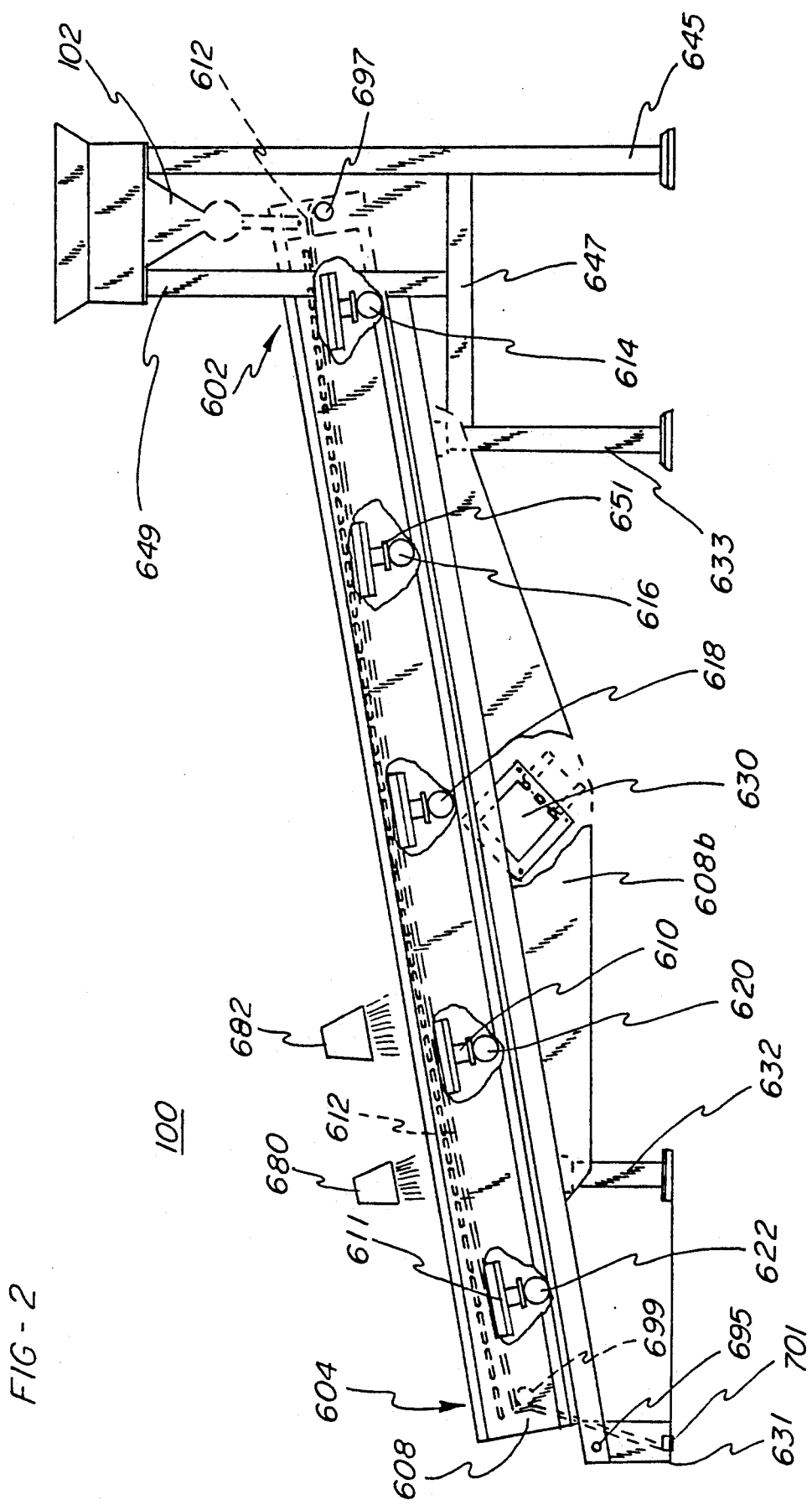
FIG. 2 is a side elevational view of the inclined surface and associated mechanisms vised for separating a high carbon content fraction from the fly ash.

Turning now to FIG. 2, a partially cut away side elevation of separator 100 is shown. Separator 100 comprises an elevated distal end 602 and a lower proximal end 604. The separator provides an inclined surface for travel of the fly ash from elevated distal end to proximal end. It will be appreciated that the angle of inclination for the separator 100 may be varied in accordance, mostly, with the physical properties of the fly ash that is to be processed thereon. Pivotal movement of the separation around pivot 695 is possible to vary the angle of inclination (relative to the horizontal) from about 10-45°. Also, the inclined surface from a side view thereof presents a slight arc, or stated differently, provides a slightly convex surface. One suitable arrangement provides about a 2" crown or elevation in the mid-point of the incline.

Hopper 102 is positioned atop distal end 602 for feeding ash to the separator 100. The separator comprises opposed side frame members 606, 608 (seen more clearly in FIG. 3) separated by a plurality of transverse support beams 610. The beams 610 are welded to machine direction support members 611 that in turn are connected to transversely disposed fabric support bars 613 (FIG. 3). Polyurethane fabric belt 612 provides the working surface for the separator and is suspended over the bars 613 (FIG. 3) Other support members span transversely across the side frames 606, 608 but are not shown and vertical supports 631, 632, 633, 645 are provided to support and elevate the separator 100, in conjunction with support members 647, 649. Belt 612 is supported by rollers 697, 699 and is secured at anchor 701.

A pair of vibrators 630 (only one of which is shown in FIG. 2) is supported between frame members 606a, 608b and is disposed at approximately the mid-point between the distal and proximal ends of the separator. These vibrators 630 provide a first set or series of vibrators in accordance with the invention and operate at about 600-1200 vibrations per minute. These vibrators function to transport, through vibratory motion, the fly ash along the fabric belt 612 from the distal end 602 to proximal end 604.

The first set or pair of vibrators 630 is preferably disposed at an angle of from about 30°-55° relative to the polyurethane fabric belt 612. At present, it is preferred to provide a pair of vibrators 630 each disposed at an angle of about 37° relative to fabric belt 612.

A second set of vibrators (614, 616, 618, 620, 622) is connected to beams 610 via mounting plates 651 and bolts (not shown). These vibrators are preferably disposed at an angle of about 75°-105° relative to the inclined surface and function to disaggregate and stratify the fly ash into two fractions: namely, 1) an enhanced fly ash fraction; and 2) a high carbon content fraction. Based upon preliminary indications, it is best to orient the vibrators 614-622 at an approximate normal angle relative to the fabric belt 612.

The vibrators 614-622 may operate at a frequency that is higher than the operating frequency for the first set or pair of vibrators 630. That is, the vibrators 614-622 may operate at about 1,000-10,000 vibrations per minute. One successful arrangement is to operate the vibrators at increasingly higher frequencies, progressing from the distal end 602 of the separator to the lower, proximal end 604. More specifically, in this arrangement, the vibrators closest to the hopper (namely, vibrators 614, 616) will operate at about 1200 vpm with those vibrators (622) disposed proximate end 604 operating at about 9,000 vpm. Vibrators 614-622 impart vibration to the fabric belt 612 through the machine direction support members 611 and transversely disposed fabric support bars 613 (see FIG. 3).

A pair of ultrasonic horns 680, 682 is supported above the fabric belt 612. These serve to separate or release the very light weight carbon particles from the vesicles or channels in the larger fly ash particles.

The ultrasonic horns are available from Branson Ultrasonics Corp., Danbury, Connecticut. Available models are capable of operating at 20,000-40,000 hertz. Although the use of ultrasonic horns is not essential, it is clearly preferred so as to help ensure optimum separation of the light weight carbon particles.

Turning now to FIG. 3, it can be seen that suspended above fabric belt 612 is an air manifold 634 that extends lengthwise above the center of the belt. Air manifold is operatively associated with air source 104 (FIG. 1) and comprises a plurality of nozzles 636 each facing one of the side frame members 606, 608.

Side frame members 606, 608 each include associated housings or chambers 638, 640. Openings 642, 644 are provided in housings 638, 640 and communicate with vacuum draft line 106 (FIG. 1) to draw air through the openings 642, 644. Together the nozzles 636 and negative pressure atmosphere in housings 638, 640 draw the lighter, high carbon content ash fraction from the upper (or more distal) portions of the incline. Pneumatic transfer line 114 (FIG. 1) transports the high carbon ash fraction from bag house 108 to storage area 116 for possible further processing as explained supra.

Rubber dampener strips 690, 692 are provided along lengthwise edges of the side frames 606, 608 along the fabric belt 612. These aid in localizing vibration only to the area of the belt 612.

The enhanced fly ash fraction of the treated fly ash travels to the proximal end of belt 612 wherein it may be gravity discharged and then, as shown schematically in FIG. 1, pneumatically transferred to enhanced fly ash storage area 200.

As can be best seen in FIG. 3A, each of the nozzles 636 comprises an adjustable extension arms 684a, b connected to adjustable flow valve 686 communicating with nozzle tip 688. These assemblies are available under the "Loc-Lin" trademark available from Lockwood Products, Inc., Lake Oswego, Oreg. The arms 684a, b, in combination with valve 686, can be best described as providing a ball in socket joint arrangement therefor providing for infinite angular adjustment of the arm in all radial directions around the center of the balls. In addition to this adjustability of the flow direction, flow rate can be individually adjusted via valve 686.

The provision of individually adjustable nozzles 636 is another unique aspect of the invention providing significant functional advantages. For example, disposition of each nozzle relative to the fabric belt 612 can be adjusted to maximize efficacy of transport of the high carbon content fraction to the housings 638, 640 for travel to bag house 108.

As another example, air flow at the nozzle locations proximate distal end 602 of the inclined surface can be adjusted via valves 686 to provide a relatively high velocity air flow rate to provide effective separation of coarse, light weight carbon particles from the fly ash. Adjustment of the valves 686 associated with nozzles 636 located toward the proximal end 604 of the separator can be made to provide a lower velocity air flow rate to enhance separation of smaller carbon particles.

It is therefore apparent that the enhanced fly ash fraction separated via separator 100 may be utilized in concrete mixtures to replace large proportions of Portland cement. More specifically, this enhanced fly ash fraction may be substituted from 1–50% by weight of the Portland cement component usually utilized in such concrete mixtures.

For example, in a normal concrete mixture adapted to provide one cubic yard of concrete, from about 400–700 pounds of Portland cement, about 1,600–2,000 pounds of a course aggregate, a sufficient quantity of fine generally sand-like aggregate, and minor amounts of optional ingredients are mixed with water in an amount equal to about 40–70% by weight of the Portland cement. The enhanced fly ash fraction, separated in accordance with the invention, could therefore be substituted for as much as 350 pounds of Portland cement normally included within the concrete add mixture.

The enhanced fly ash may be used to form pelletized aggregate and will meet lightweight specification ASTM C-331, 330, and 332.

Such mixtures may, for example, comprise about 5–25% cement, 95–75% fly ash. Improvement in compressive strength is shown when low LOI fly ashes are used. Additionally, the lower LOI fly ash requires less water than the higher LOI mixes. Water Demand and Compressive Strengths are as follows:

| | Pelletized Aggregate | |
|---|---|---|
| | Water Demand Low LOI | Water Demand High LOI |
| Cement 10% | | |
| Fly Ash 90% | 9–13% (based on solids) Compressive Strength Low LOI (1 day) | 13–18% (based on solids) Compressive Strength High LOI (1 day) |
| Cement 10% | | |
| Fly Ash 90% | 900–1800 psi | 900–1100 psi |

The enhanced fly ash fraction can also be used in combination with other fly ashes, coal combustion bottom ash, coal combustion boiler slags, and the like to provide a backfill material of the type especially valuable for backfilling trenches for utility work on water lines, sewer lines, gas lines and buried electrical cable.

Backfill uses involve the use of fly ash in various stages of moisture to facilitate compaction. The higher the moisture content, the more difficult it is to reach optimum moisture and compacted density. This is thought to be true due to spacing between particles and certainly increased amounts of water would increase this distance. A finer grained material, such as fly ash, is easier to compact than all coarse grained material, but increased amounts of moisture would detract from this effort.

Carbon in fly ash is difficult to wet, and usually the higher the carbon content, the higher the water demand needed to achieve a given moisture. Thus, a fly ash lower in carbon would demonstrate a lower optimal moisture and would provide an enhanced material for the use of fly ash in structural fill applications.

Additionally, the enhanced fly ash fraction may be used in soil stabilization mixes in conjunction with any one of a host of cementitious binders including Portland cement, lime, lime kiln dust, and cement kiln dust. Cement and fly ash react together to improve compressive strength of fly ash or fly ash/soil mixtures. Higher water demand reduces strength gain. The requirement for cement is usually 1–6% fly ash, depending on ash or soil. High carbon ash would be on the high end.

Lime/line kiln dust/cement kiln dust would require 4–12% fly ash as a binder which is much slower in gaining strength. The lime must react with a given fly ash to form a cementitious material where the cement is cementitious in its own right. High carbon fly ash has a lower pozzolanic activity and a higher water demand than low carbon fly ash. Accordingly, high carbon fly ash requires more lime in order to obtain a required compressive strength.

It is also apparent that removal of substantial amounts of the carbon component of such high carbon fly ash admixtures also improves the results of the 325 mesh fineness of a given fly ash treated in accordance with the invention which facilitates meeting the specification requirements for fineness given in ASTM C-618.

It should be mentioned that removal of carbon from fly ash and subsequent improvement in the fineness of the enhanced fly ash will contribute to improved density of resulting concrete products made therewith. The subsequently made concrete will be less susceptible to penetration by water with less bleeding in the fresh concrete. This will increase resistance of the concrete to penetration by water and chemical bearing waters and improve resistance of the concrete to sulfate attack.

Preliminary studies reveal that carbon content reduction of from 10–80 wt. % is possible in accordance with the inventive methods and apparatus herein described.

Although the invention has been described primarily with regard to fly ash and separation of the fly ash into a high carbon content fraction and an enhanced fly ash fraction, it can be used to separate almost any particulate matter into a light fraction and heavier or enhanced fraction. In this regard, wood ash is specifically mentioned as one class of particulate matter that can be separated in accordance with the invention.

In accordance with the above, particular embodiments of the inventions have been described for purposes of example and illustration. It will be evident to those skilled in the art that numerous variations of the details may be made without departing from the invention as defined in the appended claims. For example, instead of the slightly convex, inclined surface shown in FIG. 2, a descending spiral or screw shaped incline can also be envisioned.

What is claimed is:

1. Method of reducing the carbon content of particulate matter selected from the group consisting of fly ash and wood ash, comprising:
   a) providing an inclined surface having an elevated distal end and a lower proximal end;
   b) positioning said particulate matter at said distal end;
   c) subjecting said inclined surface to a first source of vibration to transport said particulate matter from said distal end toward said lower proximal end;
   d) subjecting said inclined surface to a second source of vibration during said particulate matter transport to separate said particulate matter into a high carbon content fraction and a heavier, enhanced particle fraction;
   e) removing said high carbon content fraction from said inclined surface; and
   f) recovering said heavier, enhanced particle fraction.

2. Method as recited in claim 1 wherein said step c) comprises vibrating said inclined surface from said first source of vibration at a frequency of 600–1,200 vibrations per minute.

3. Method as recited in claim 2 wherein said step c) comprises subjecting said inclined surface to a plurality of vibratory sources, each located at an angle of from about 30° to 55° with respect to said inclined surface.

4. Method as recited in claim 3 wherein said step c) comprises subjecting said inclined surface to a plurality of vibratory sources, each located at an angle of about 37° with respect to said inclined surface.

5. Method as recited in claim 1 further comprising heating said particulate matter.

6. Method as recited in claim 5 comprising heating said particulate matter to a temperature between about the dew point to 100° C.

7. Method as recited in claim 1 wherein said step d) comprises vibrating said inclined surface from said second source of vibration at a frequency of about 1,000–10,000 vibrations per minute.

8. Method as recited in claim 7 wherein said step d) comprises subjecting said inclined surfaces to a plurality of vibratory sources each located at an angle of about 75°–105° relative to said inclined surface.

9. Method as recited in claim 8 wherein said angle is about 90°.

10. Method as recited in claim 1 further comprising subjecting said inclined surface to a third vibratory source comprising an ultrasonic vibrator.

11. Method as recited in claim 1 wherein said step e) comprises subjecting said high carbon content fraction to a vacuum draft in operative association with a collection chamber.

12. Method as recited in claim 11 wherein said step e) further comprises pushing said high carbon content fraction toward said vacuum draft by exerting air flow thereon.

13. Method of reducing the carbon particle content of a fly ash mixture containing from about 4% to about 20% of said carbon particles comprising:
   a) providing an inclined surface having an elevated distal end and a lower proximal end;
   b) feeding said fly ash mixture having from about 4–20% of said carbon particles to said elevated distal end of said surface;
   c) heating said fly ash mixture to a temperature of from about the dew point to about 100° C.;
   d) subjecting said fly ash mixture to a first source of vibration located along said surface to convey said fly ash mixture from said distal end toward said lower proximal end, said first source of vibration located at an angle of about 30° to 55° with respect to said inclined surface;
   e) subjecting said fly ash mixture to a second source of vibration located along said surface to separate said fly ash mixture into a high carbon content fraction and an enhanced fly ash fraction;
   f) recovering said enhanced fly ash fraction at a location proximate to said lower proximal end of said surface; and
   g) removing said separated high carbon content fraction from said surface.

14. Method as recited in claim 13 further comprising separating cenospheres from said high carbon content fraction.

15. Method as recited in claim 13 further comprising adding said high carbon content fraction to a froth flotation cell, and separating light weight constituents from said high carbon content fraction.

16. Method as recited in claim 13 wherein said step d) comprises vibrating said fly ash mixture from said first source of vibration operating at about 600–1,200 vibrations per minute.

17. Method as recited in claim 13 wherein in said step e) a plurality of said second sources of vibration are provided and wherein each said second source of vibration is located at an angle of about 70°–105° with respect to said inclined surface.

18. Method as recited in claim 17 wherein in said step e) said second sources of vibration each vibrate at a frequency of about 1,000–10,000 vibrations per minute.

19. Method as recited in claim 13 wherein said step e) comprises subjecting said fly ash mixture to ultrasonic vibrations.

20. Concrete admixture comprising from 1–50 weight % Portland cement in combination with 1–50 weight % of an enhanced fly ash fraction recovered by the process of claim 13.

21. Cementitious mixture comprising, in combination, an enhanced fly ash fraction recovered in the process of claim 13, and a cementitious binder.

22. Cementitious mixture as recited in claim 21 wherein said cementitious binder comprises a member selected from the group consisting of Portland cement, lime, lime kiln dust, and cement kiln dust and mixtures thereof.

23. Cementitious mixture useful as a backfill comprising, in combination, an enhanced fly ash fraction recovered in the process of claim 13, and a member selected from the group consisting of fly ash, coal combustion ash, and coal combustion boiler slag, and mixtures thereof.

24. Apparatus for reducing the carbon content of particulate matter selected from the group consisting of fly ash and wood ash, comprising:
  a) an inclined surface having an elevated distal end and a lower proximal end;
  b) a first vibration means for vibrating said inclined surface to move said particulate matter from said elevated distal end toward said lower proximal end;
  c) a second vibration means for disaggregating said particulate matter and separating it into a high carbon fraction and a heavier enhanced particulate fraction-,
  d) high carbon content removal means operatively associated with said inclined surface for removing said high carbon content fraction from said inclined surface; and
  e) enhanced particulate fraction recovery means for recovering said enhanced particulate fraction from said inclined surface.

25. Apparatus as recited in claim 24 wherein said first vibration means (b) comprises a vibrator positioned at an angle of 30°-55° relative to said inclined surface and vibrating at a frequency of about 600-1200 vibrations per minute.

26. Apparatus as recited in claim 24 wherein said second vibration means (e) comprises a plurality of second vibrators disposed along said inclined surface, each said vibrator positioned at an angle of 75°-105° relative to said inclined surface.

27. Apparatus as recited in claim 26 wherein each said second vibrator operates at a frequency of 1,000-10,000 vibrations per minute.

28. Apparatus as recited in claim 27 wherein each said second vibrator is positioned at one of a plurality of locations positioned along said inclined surface from said distal end to said proximal end, the vibration frequency of said second set of vibrators increasing from distal end to proximal end positioning.

29. Apparatus as recited in claim 24 wherein said step (c) comprises ultrasonic vibrating means positioned proximate said inclined surface.

30. Apparatus as recited in claim 24 wherein said high carbon content removal means comprises vacuum means (f) adjacent said inclined surface for drawing a vacuum draft on said high carbon fraction, and collection means (g) communicating with said vacuum means.

31. Apparatus as recited in claim 30 further comprising air jet means (h) for jetting plural streams of air onto said high carbon fraction to direct it toward said vacuum draft.

32. Apparatus as recited in claim 31 wherein said air jet means (h) comprises a plurality of air nozzles and individual adjustment means associated with each said nozzle for providing directional and air velocity adjustment for each said air nozzle.

* * * * *

UNITED STATES PATENT AND TRADEMARK OFFICE
CERTIFICATE OF CORRECTION

PATENT NO. : 5,299,692
DATED : April 5, 1994
INVENTOR(S) : Robert D. Nelson, Jerry L. Heavilon, Robert W. Styron, Bill G. Fletcher It is certified that error appears in the above-indentified patent and that said Letters Patent is hereby corrected as shown below:

Claim 26, Column 11, line 28, "(e)" should read --(c)--.

Signed and Sealed this

Sixth Day of September, 1994

Attest:

BRUCE LEHMAN

*Attesting Officer*     *Commissioner of Patents and Trademarks*